Patented June 12, 1945

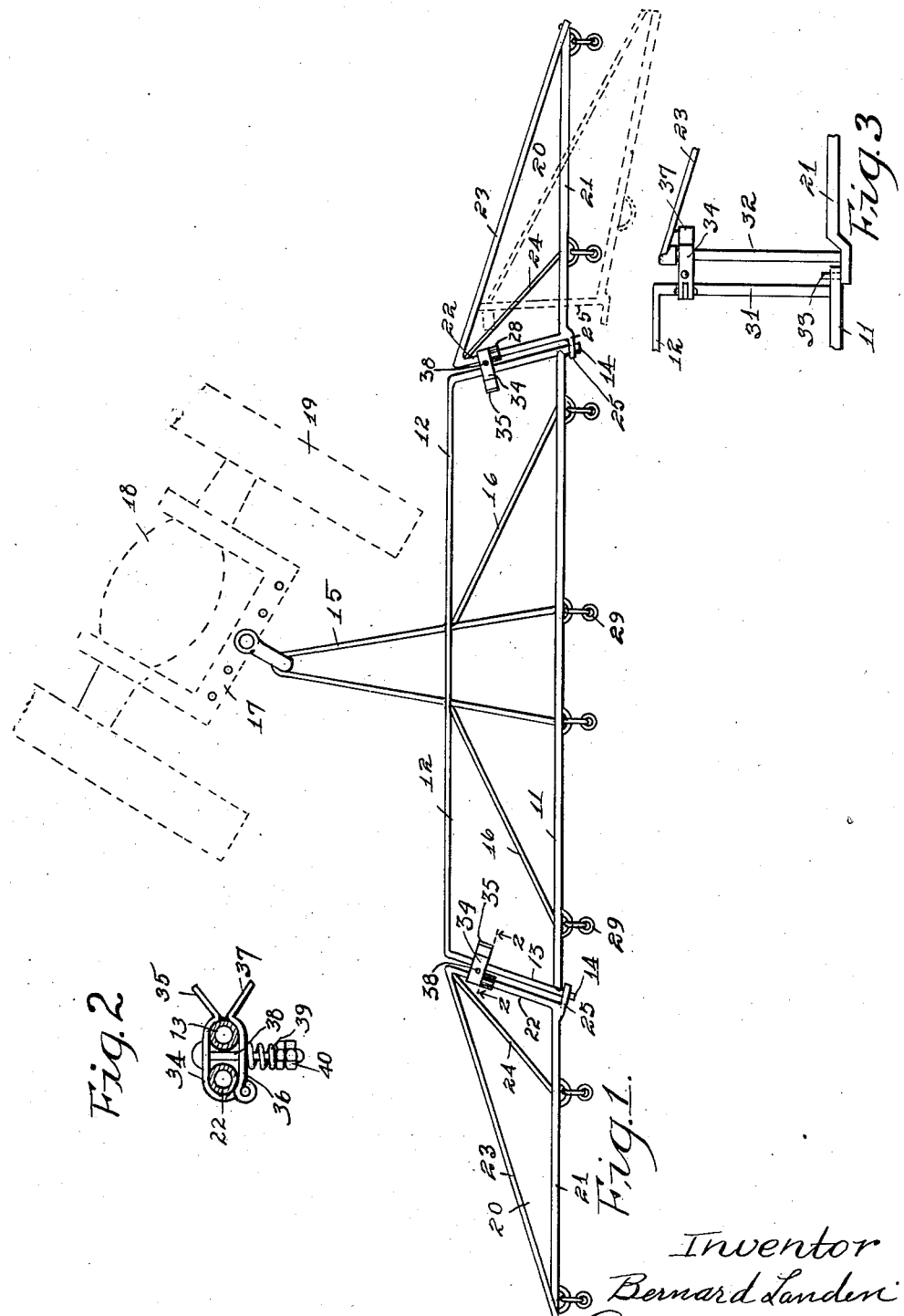

2,377,945

UNITED STATES PATENT OFFICE 2,377,945

DRAWBAR FOR HARROWS

Bernard Landen, Ida Grove, Iowa

Application February 27, 1942, Serial No. 432,593

1 Claim. (Cl. 55—84)

This invention relates to an improved draw bar for harrows and an improvement on the draw bar illustrated and described in my co-pending application Serial No. 408,691, filed August 29, 1941, and issued as Patent 2,339,018 embodying a central section and an end section hinged to each end of said central section in such a manner that the free ends of the end sections will be raised up automatically when engaging an obstacle such as a fence post or a rock having comparatively smooth surfaces. I find, however, that if one of the end sections should engage a fence post at a point beneath a fence board or wire, said board or wire might prevent the engaged end of the draw bar from sliding upwardly to position to disengage the obstruction, in which case breakage might result, especially when the draw bar and the harrows connected thereto are pulled by means of a tractor.

The object of my invention is to provide in a drawbar of the type above described, an improved construction wherein an end section engaging an obstruction having a laterally extending portion or a member that would prevent upward movement of the hinged section of the draw bar may be automatically disconnected from the central portion when pressure is applied to the engaged end sections beyond a certain predetermined amount, and which may be easily and quickly again attached to operative position after the obstruction has been passed.

A further object of my invention is to provide in a draw bar having hinged end sections, an improved construction wherein a portion will extend forwardly of the central section and between the tractor wheels to a point near the draft bar of the tractor to be connected thereto by means of any suitable means, such as a clevis, the forwardly extending portion being of such length as to permit the tractor to be turned relative to the draw bar, through a considerable angle without the wheels engaging said draw bar.

My invention consists in the construction, arrangement and combination of the various parts of the device, whereby the objects contemplated are attained, as hereinafter more fully set forth, pointed out in my claim, and illustrated in the accompanying drawing, in which:

Figure 1 is a plan view of my improved draw bar showing in dotted lines the rear end of a tractor to illustrate the manner in which the tractor may be turned without the wheels engaging the forward end of the draw bar, one of the end sections of the draw bar being illustrated disconnected, in dotted lines;

Fig. 2 is an enlarged sectional view taken on the line 2—2 of Fig. 1; and

Figure 3 illustrates a slightly modified form of hinge connection between the end sections and the central section.

My improved draw bar comprises a central section 10 formed of fabricated metal having preferably a tubular bar 11 forming the rear end, and a rod 12 forming the forward end and substantially parallel with the member 11, each end of the rod 12 being extended rearwardly and outwardly to form end portions 13, the rear ends of the members 13 extending rearwardly beyond the ends of the member 11, to form hinge portions 14. The central portion of the section 10 is provided with a hitch 15 formed of a rod of substantially U or V shape, having its apex end extending forwardly of the rod 12 a considerable distance, the body of the member 15 being welded to the members 11 and 12, as clearly illustrated in Figure 1. Brace rods 16 are provided as illustrated.

The forward end of the member 15 is connected to the draft bar 17 of a tractor 18 in the usual manner, with the said member 15 extending between the wheels 19 so that the tractor may be turned through a considerable angle without the wheels 19 engaging the bar 12.

The central section is provided with end sections 20 each comprising a tubular back bar 21 and a forwardly and inwardly extending end member 22 substantially parallel with the adjoining member 13, and an inclined front member 23 extending from the forward end of the member 22 to the outer end of the member 21, all of said parts being welded together to form a unitary frame having a brace bar 24. The bars 11 and 21 carry links 29 to which harrow sections may be connected in the usual manner. The inner end of each of the members 21 is provided with a loop 25 supported around the pivot member 14. The upper end of each of the members 22 is provided with an inwardly extended top bar 34, having its inner end 35 bent upwardly, and a bottom bar 36 pivoted to the outer end of the bar 34 and having a downwardly bent inner end 37. A bolt 38 extends through the bars 34 and 36 and between the members 13 and 22, with a spring 39 and nuts 40 yieldably retaining the bars 34 and 36 in a closed or clamped position on the members 13 and 22 as illustrated in Fig. 2. A collar 26 on the upper end of a member 22 prevents an end section 20 from moving rearwardly when the bars 34 and 36 are in their closed position. By virtue of the hinged connection of a loop 25 of each end section 20 with a corresponding projection 14, and the yieldable clamping connection of associated members 13 and 22 by the bars 34 and 36 and the spring 39, each end section 20 is pivotally movable about a corresponding member 13.

In actual operation, if the free end of one of the end sections 20 engages an obstruction so as to be held against upward pivotal movement the forward end of a member 13 is pulled from between the free ends of the bars 34 and 36 due to the forward ends of the members 22 swinging outwardly about a projection 14 as a pivot. When the bars 34 and 36 are moved outwardly a distance such that they are disengaged from the collar 28, the entire section 20 is moved rearwardly until the loop 25 disengages the pivot members 14, whereby the entire section is automatically disconnected from the central section 10. Any injury to the draw bar as a result of striking an obstruction is thus eliminated.

In Fig. 3 I have illustrated a slightly modified form and wherein the end members 31 are supported at right angles to the member 11, and the members 32 at right angles to the member 21, with a pin 33 projecting forwardly through the end of the member 11 to provide a pivot for an end section 20, and in such a manner that the said pivot 33 may slide rearwardly and out of the member 11. The forward ends of correpsonding members 31 and 32 are yieldably connected together by bars 34 and 36 and a spring 39 in all respects similar to the yieldable connection of the forward ends of the members 13 and 22 in Fig. 1. When an excessive strain is applied to the free end of an end section 20 the forward end of a member 32 is pulled from between the free ends of the bars 34 and 36 permitting the end sections to be disconnected in the manner above described in connection with Fig. 1.

Thus, it will be seen that I have provided an improved draw bar for harrows having hinged end sections connected to the central section in such a manner that said end sections will be automatically disconnected from the central section when excessive pressure is applied to the free ends of the end sections, without injury to the draw bar.

It will further be seen that I have provided a harrow draw bar having a hitch arrangement wherein the tractor may be turned to a considerable angle without the wheels engaging the forward end of the draw bar and at the same time providing a stiff hitch wherein the draw bar may be supported in an inclined plane extending upwardly and forwardly from its points of connection with the harrow sections to the draft bar of the tractor. This is of considerable importance when the draft bar is used in connection with the end sections having inclined pivots and their forward edges inclined rearwardly and outwardly to permit the free ends of the sections to be automatically elevated when they engage comparatively smooth and upright obstructions, such as a fence post or a tree trunk, as it is important that the draw bar be supported in said upwardly and forwardly inclined plane.

I claim as my invention:

A draw bar for harrows, comprising a central section including parallel front and back bars, an end member for said central section extended between said front and back bars, an end section incuding a frame member extended adjacent said end member, means releasably pivotally connecting said two members including tension means for normally retaining said pivotal connection to provide for relative pivotal movement between said two sections, with a pressure applied on said end section in a rearward direction in excess of the pressure of said tension means acting on said tension means to release the end section from said central section at said pivotal connection.

BERNARD LANDEN.